(12) United States Patent
Meng (10) Patent No.: US 11,109,734 B2
(45) Date of Patent: Sep. 7, 2021

(54) COMBINED ROBOT

(71) Applicant: ECOVACS ROBOTICS CO., LTD., Suzhou (CN)

(72) Inventor: Fanming Meng, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 291 days.

(21) Appl. No.: 16/303,083

(22) PCT Filed: May 19, 2017

(86) PCT No.: PCT/CN2017/085054
§ 371 (c)(1),
(2) Date: Nov. 19, 2018

(87) PCT Pub. No.: WO2017/198214
PCT Pub. Date: Nov. 23, 2017

(65) Prior Publication Data
US 2019/0298138 A1    Oct. 3, 2019

(30) Foreign Application Priority Data
May 19, 2016 (CN) .......................... 201610333081.6

(51) Int. Cl.
*A47L 11/40* (2006.01)
*A47L 11/28* (2006.01)
(Continued)

(52) U.S. Cl.
CPC ............. *A47L 11/4036* (2013.01); *A47L 9/00* (2013.01); *A47L 11/28* (2013.01); *A47L 11/40* (2013.01);
(Continued)

(58) Field of Classification Search
CPC ...... A47L 11/28; A47L 11/40; A47L 11/4036; A47L 11/4061; A47L 2201/00;
(Continued)

(56) References Cited

U.S. PATENT DOCUMENTS 7,173,391 B2 *  2/2007  Jones ................... G05D 1/0219
                                                       318/568.12
7,441,298 B2 * 10/2008  Svendsen ............. G05D 1/0227
                                                       15/49.1
(Continued)

FOREIGN PATENT DOCUMENTS

CN        2286684 U     7/1998
CN        2286684 Y    10/1998
(Continued)

OTHER PUBLICATIONS

CN-202005711-U—English Machine Translation (Year: 2011).*
(Continued)

*Primary Examiner* — Marc Carlson
(74) *Attorney, Agent, or Firm* — Maschoff Brennan (57) ABSTRACT

A combined robot includes a self-moving robot and a functional module, in which the functional module is detachably combined into the self-moving robot through a connecting piece. Driving wheels and a driven wheel are disposed at a bottom of a machine body of the self-moving robot. By taking an advancing direction when the self-moving robot operates as a forward direction, the driving wheels are located on a left side and a right side of the bottom of the machine body. The driven wheel is located at a front end or a rear end of the bottom of the machine body. A control center is disposed in the combined robot and controls the combined robot to operate. One end away from the driven wheel of the bottom of the machine body of the
(Continued)

self-moving robot is a supporting end, and floating supporting mechanisms are disposed at the supporting end.

11 Claims, 5 Drawing Sheets

(51) Int. Cl.
    *F24F 13/32*     (2006.01)
    *B25J 19/00*     (2006.01)
    *B25J 5/00*     (2006.01)
    *A47L 9/00*     (2006.01)
    *B25J 11/00*     (2006.01)

(52) U.S. Cl.
    CPC ............. *A47L 11/4061* (2013.01); *B25J 5/00* (2013.01); *B25J 11/00* (2013.01); *B25J 19/00* (2013.01); *F24F 13/32* (2013.01); *A47L 2201/00* (2013.01)

(58) Field of Classification Search
    CPC .... A47L 9/00; B25J 11/00; B25J 19/00; B25J 5/00; F24F 13/32
    See application file for complete search history.

(56) References Cited

U.S. PATENT DOCUMENTS

| | | | | |
|---|---|---|---|---|
| 7,620,476 | B2 * | 11/2009 | Morse | A47L 5/14 15/319 |
| 7,761,954 | B2 * | 7/2010 | Ziegler | A47L 11/302 15/320 |
| 8,961,695 | B2 * | 2/2015 | Romanov | A47L 11/4036 134/18 |
| 9,883,778 | B2 * | 2/2018 | Vanderstegen-Drake | A47L 11/4061 |
| 10,239,370 | B2 * | 3/2019 | Ebrahimi Afrouzi | B60G 3/26 |
| 10,800,208 | B2 * | 10/2020 | Afrouzi | B62D 65/00 |
| 2005/0214368 | A1 | 9/2005 | Kawakami et al. | |
| 2008/0307590 | A1 * | 12/2008 | Jones | A47L 9/0411 15/21.1 |
| 2016/0000282 | A1 * | 1/2016 | Vanderstegen-Drake | A47L 9/009 280/6.157 |
| 2019/0133400 | A1 * | 5/2019 | Klintemyr | A47L 9/0494 |

FOREIGN PATENT DOCUMENTS

| | | | |
|---|---|---|---|
| CN | 201566410 | U | 9/2009 |
| CN | 201566410 | U | 9/2010 |
| CN | 202005711 | U * | 10/2011 |
| CN | 202005711 | U | 10/2011 |
| CN | 2020057111 | U | 10/2011 |
| CN | 203693503 | U | 7/2014 |
| CN | 105142478 | A | 12/2015 |
| CN | 205201560 | U | 5/2016 |
| CN | 205734879 | U | 11/2016 |
| JP | 2006130005 | A | 5/2006 |

OTHER PUBLICATIONS

European Search Report in Application No. 17798777.3 dated Aug. 12, 2019.

CN Office Action in Application No. 201610333081.6 dated Apr. 15, 2019.

CN Office Action in Application No. 201610333081.6 dated Dec. 25, 2019.

* cited by examiner

COMBINED ROBOT

TECHNICAL FIELD

The invention relates to a combined robot, and belongs to the technical field of intelligent household electrical appliance manufacturing.

BACKGROUND ART

A traditional floor sweeping robot is provided with a front driven wheel at the bottom and two driving wheels located on two sides of a middle portion of a machine body. As the center of gravity of the machine body is located in a front side of the machine body, the robot will hardly jolt during walking even if encountering uneven surfaces such as a slope and a small step.

With the increasing demands of users, a multi-functional robot is developed. With the increasing of functional modules, the height and weight of the multi-functional robot are increased accordingly, and the center of gravity of the complete multi-functional robot is located in a middle portion of a machine body, thus the multi-functional robot is prone to jolt when encountering the uneven surfaces such as the slope and the small step, which affects the stability of the multi-functional robot. Particularly, when the robot encounters a pit or the step, the center of gravity of the robot will shift backwards, and a rear end of the robot lands accordingly, leading to that the robot is prone to get stuck to the pit or the step. Or, if the multifunctional robot has a water tank for humidification, the multi-functional robot is prone to jolt when encountering the uneven surfaces such as the slope and the small step, which easily results in overflow of the water tank to cause bad situations like electrical short circuit of the robot or pollution.

SUMMARY OF THE INVENTION

The technical problem to be solved by the invention is to provide a combined robot to overcome the defects in the prior art. With the adoption of floating supporting mechanisms, the floating supporting mechanisms can extend and contract to support when the combined robot walks on uneven ground, so that the walking stability of the combined robot is improved, and hidden dangers like getting stuck during walking are reduced.

The technical problem to be solved by the invention is realized by the following technical scheme: a combined robot, comprising a self-moving robot and a functional module; wherein the functional module is detachably combined into the self-moving robot through a connecting piece; driving wheels and a driven wheel are disposed at a bottom of a machine body of the self-moving robot; by taking an advancing direction when the self-moving robot operates as a forward direction, the driving wheels are located on a left side and a right side of the bottom of the machine body; the driven wheel is located at a front end or a rear end of the bottom of the machine body; a control center is disposed in the combined robot and controls the combined robot to operate; one end, far away from the driven wheel, of the bottom of the machine body of the self-moving robot is a supporting end; and floating supporting mechanisms are disposed at the supporting end, so that the machine body of the self-moving robot is kept parallel to a walking plane when the self-moving robot walks.

To keep the balance of the combined robot, a distance between each floating supporting mechanism and a vertex of the supporting end is less than or equal to ⅓ of a length of the machine body of the self-moving robot.

To achieve a better supporting effect, the distance between each floating supporting mechanism and the vertex of the supporting end is less than or equal to ½ of a distance between the corresponding driving wheel and the vertex of the supporting end.

To allow the combined robot to walk better, a maximum distance between each floating supporting mechanism and the bottom of the machine body of the robot and a minimum distance between the corresponding driving wheel and the bottom of the machine body of the robot are identical, and a distance difference between the minimum distance between the floating supporting mechanism and the bottom of the machine body of the robot and the maximum distance between the floating supporting mechanism and the bottom of the machine body of the robot is less than or equal to 10 mm.

Alternatively, the set quantity of the floating supporting mechanisms is two, and the floating supporting mechanisms are disposed on a left side and a right side of the supporting end respectively.

To equip the self-moving robot with a wiping function, a cleaning cloth assembly is detachably mounted at the supporting end and is located between the two floating supporting mechanisms. Alternatively, the machine body of the self-moving robot comprises a base; the base is provided with an accommodation space; and the floating supporting mechanisms are disposed in the accommodation space in a sliding manner.

Further, the floating supporting mechanisms comprise springs, supporting wheels and brackets, the supporting wheels consist of wheels and rotary shafts, the rotary shafts are disposed on the brackets, and the brackets are elastically connected with the base through the springs; or, the floating supporting mechanisms comprise springs and supporting frames, the supporting frames comprise supporting ends and connecting ends, the supporting ends are partially exposed out of the base, and the connecting ends are elastically connected with the base through the springs.

Preferably, the supporting frames are made of anti-static wear-resistant materials.

To facilitate the combination of the combined robot, the connecting piece comprises a body; a boss is disposed on one side of the body; a locating column is disposed on the other side of the body; a pit is disposed on a lower surface of the functional module; the set quantity and the set position of the pit correspond to the set quantity and the set position of the boss; a groove is disposed on an upper surface of the self-moving robot; and the set quantity and the set position of the groove correspond to the set quantity and the set position of the locating column.

In conclusion, the combined robot provided in the invention has the advantages that with the adoption of the floating supporting mechanisms, the floating supporting mechanisms can extend and contract to support when the combined robot walks on uneven ground, so that the walking stability of the combined robot is improved, and hidden dangers like getting stuck during walking are reduced.

The technical scheme of the invention is described in detail in combination with accompanying drawings and preferred embodiments.

DETAILED DESCRIPTION OF THE INVENTION

Figure 1:
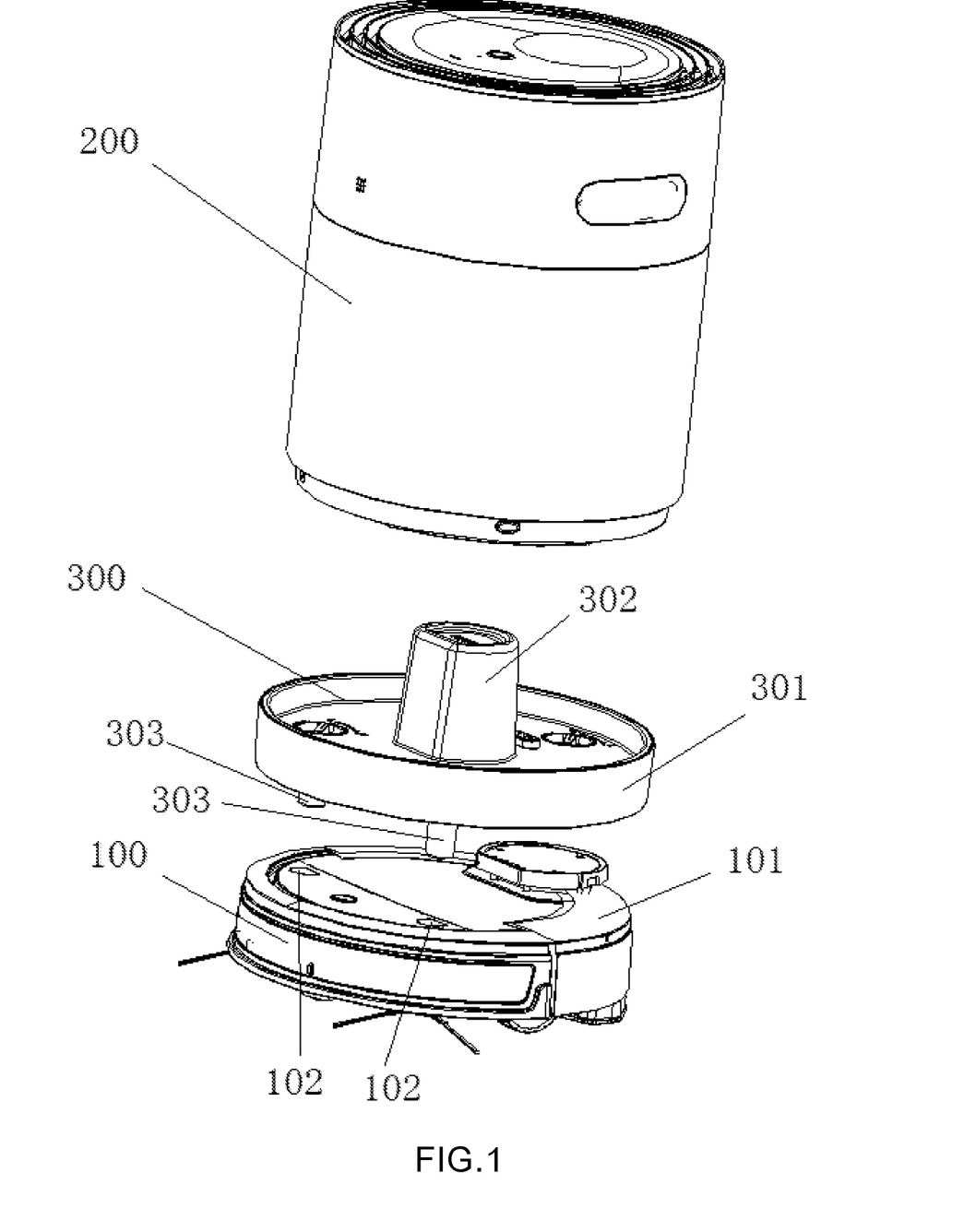
FIG. 1 is an exploded diagram of a combined robot provided in an example of the invention.

FIG. 1 is an exploded diagram of a combined robot provided in this example. As shown in FIG. 1, the example provides a combined robot, comprising a self-moving robot 100 and a functional module 200, wherein the functional module 200 is detachably combined into the self-moving robot 100 through a connecting piece 300; a control center (not shown in the drawing) is disposed in the self-moving robot 100 and used for controlling the combined robot to operate;

the connecting piece 300 comprises a body 301; a boss 302 is disposed on one side of the body 301; a locating column 303 is disposed on the other side of the body 301; a pit (not shown in FIG. 1) is disposed in a lower surface of the functional module 200; the set quantity and the set position of the pit correspond to the set quantity and the set position of the boss 302; a groove 102 is disposed on an upper surface 101 of the self-moving robot 100; the set quantity and the set position of the groove 102 correspond to the set quantity and the set position of the locating column 303, so that the functional module 200 is combined into an upper portion of the self-moving robot 100, that is, the combined robot combines and connects the functional module 200 to be connected with the self-moving robot 100 through the connecting piece 300; a power supply module is further disposed on the connecting piece 300, and can supply electric energy on the self-moving robot 100 to the functional module 200 through an electronic contact;

the functional module 200 is one or more of modules such as a security and protection module, a humidification module and a purification module; the security and protection module, for example, comprises a camera and a communication module, and the camera is connected with a remote terminal through the communication module (such as a WLAN wireless access point and a router), so that a user of the remote terminal can monitor a surrounding environment of the combined robot through a viewing screen; the humidification module can atomize water and then spray out to humidify the surrounding environment of the combined robot; the purification module, for example, comprises a negative ion generation module, and a photocatalyst catalysis module or/and a dust filter device, so that bacteria are killed, a peculiar smell is removed and free particulate matter in air is absorbed effectively, and an effect of purifying the air is achieved; and the functional modules described above are well known in the art and thus are not described herein.

Figure 2:
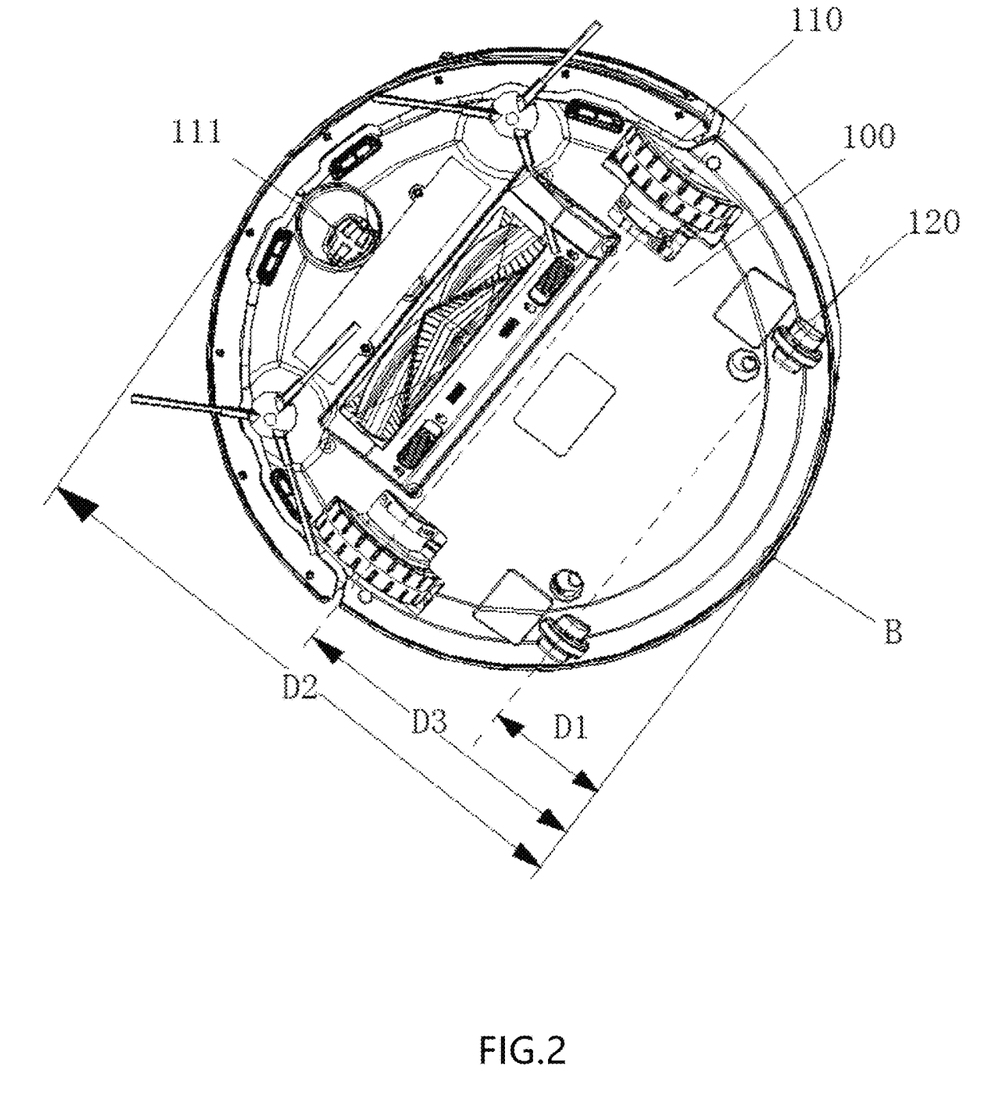
FIG. 2 is a bottom view of a self-moving robot provided in an example of the invention.
Figure 3:
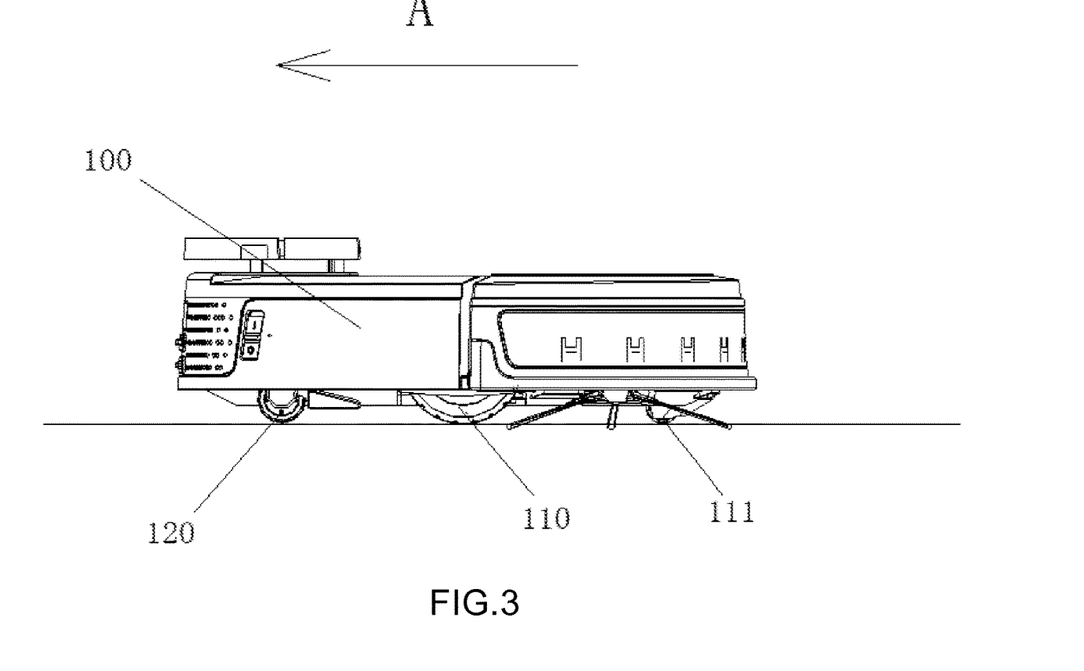
FIG. 3 is a walking diagram of the self-moving robot, provided in the example of the invention, on a flat surface.

FIG. 2 is a bottom view of a self-moving robot in this example. As shown in FIG. 2, a walking unit and a cleaning unit are disposed on a machine body of the self-moving robot 100; the walking unit comprises a motor (not shown in FIG. 2), driving wheels 110 and a driven wheel 111; and the control center controls the combined robot to operate and controls the motor to output power outwards to drive the driving wheels 110 to rotate. As shown in FIG. 3, by taking an advancing direction when the self-moving robot operates as a forward direction, the driving wheels 110 are located on a left side and a right side of the bottom of the machine body; and the driven wheel 111 is located at a front end or a rear end of the bottom of the machine body. As shown in FIG. 2 and FIG. 3, one end, far away from the driven wheel 111, of the bottom of the machine body of the self-moving robot is a supporting end; and floating supporting mechanisms 120 are disposed at the supporting end. When the self-moving robot encounters uneven ground, the floating supporting mechanisms 120 can extend and contract to support, so that the machine body of the self-moving robot is kept parallel to a walking plane when the self-moving robot walks, the walking stability of the robot is improved, and hidden dangers like getting stuck during walking can be reduced.

Alternatively, a distance D1 between each floating supporting mechanism 120 and a vertex B of the supporting end is not greater than ⅓ of a length D2 of the machine body of the self-moving robot 100. In one embodiment as shown in FIG. 2, the self-moving robot 100 has a disc-shaped machine body, and correspondingly, the length D2 of the machine body of the self-moving robot 100 is the diameter of a disc. To achieve a better supporting effect, the distance D1 between each floating supporting mechanism 120 and the vertex B of the supporting end is less than or equal to ½ of a distance D2 between the corresponding driving wheel 110 and the vertex B of the supporting end. If the floating supporting mechanisms 120 are too close to the driving wheels 110 (the distance is less than ½ of the distance between each driving wheel 110 and the vertex B of the supporting end), when encountering walking surfaces like a step or a slope, a rear end of the self-moving robot will be in contact with or prop against the walking surfaces occasionally, leading to that the robot cannot walk.

Figure 4:
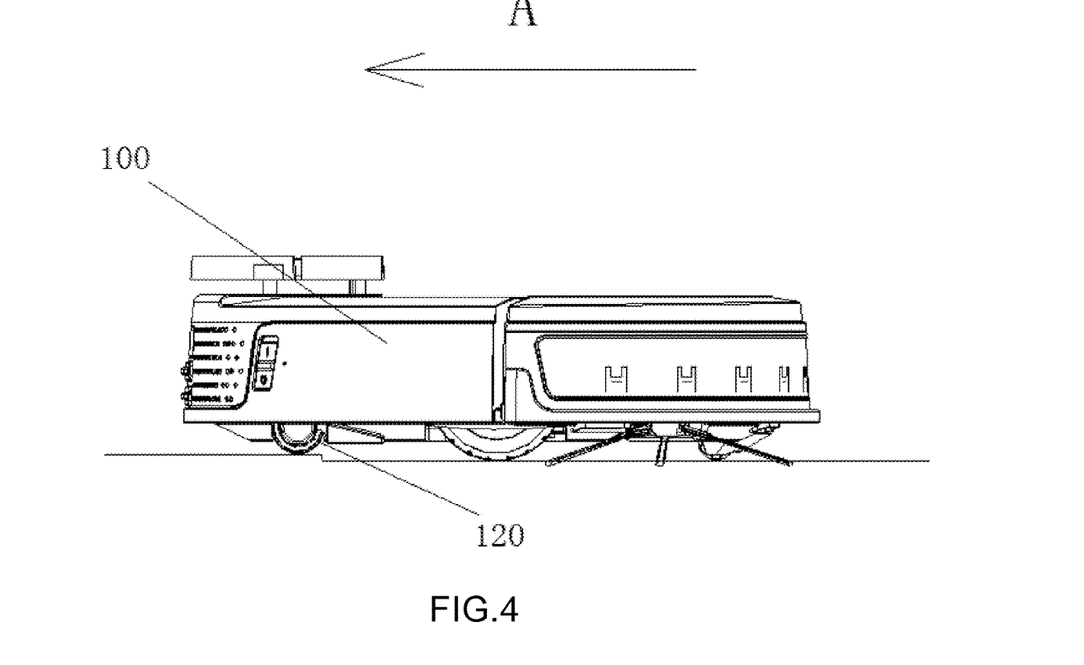
FIG. 4 is a walking diagram of the self-moving robot, provided in the example of the invention, when encountering a step.

FIG. 3 is a walking diagram of the self-moving robot in this example on a flat surface; FIG. 4 is a walking diagram of the self-moving robot in this example when encountering a step. As shown in FIG. 3 and FIG. 4, when the self-moving robot 100 walks on the flat surface, the floating supporting mechanisms 120 are in contact with the flat surface, and the floating supporting mechanisms 120 and the driving wheels 110 together support the self-moving robot 100, so that the self-moving robot 100 is kept horizontal; when the self-moving robot 100 encounters the step, the floating supporting mechanisms 120 are extruded to contract, and the self-moving robot 100 is still basically kept horizontal under the supporting of the floating supporting mechanisms 120 and the driving wheels 110; when the self-moving robot 100 encounters a pit, the floating supporting mechanisms 120 extend, bottoms of the floating supporting mechanisms 120 are in contact with the pit, and the self-moving robot 100 is still basically kept horizontal under the supporting of the floating supporting mechanisms 120 and the driving wheels 110.

In one realizable embodiment, as shown in FIG. 2, the set quantity of the floating supporting mechanisms 120 is two, and the two floating supporting mechanisms 120 are disposed on a left side and a right side of the supporting end respectively, so that a using space of the supporting end is reserved. For example, the self-moving robot in the invention is a cleaning robot; a cleaning cloth assembly is detachably mounted at the supporting end; and the cleaning cloth assembly is located between the two floating supporting mechanisms 120.

Figure 5:
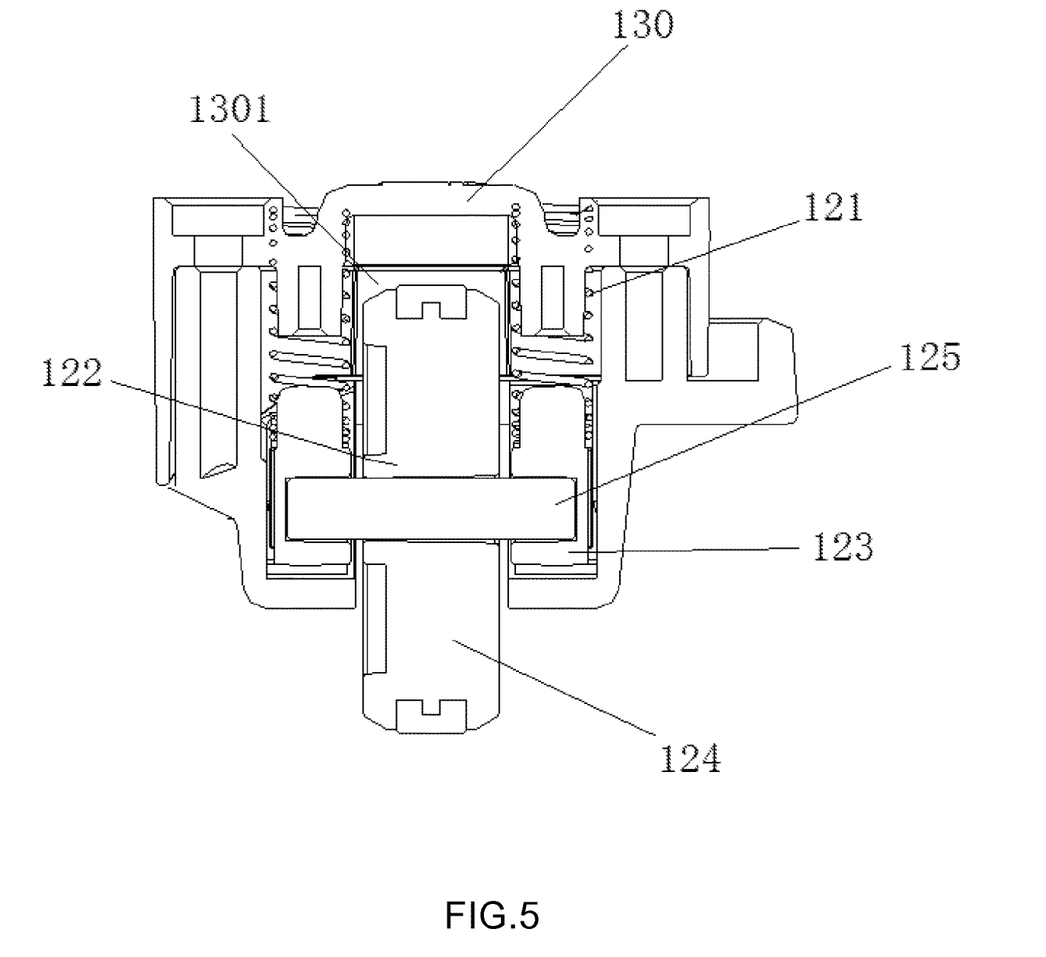
FIG. 5 is a structure diagram of a floating supporting mechanism provided in an example of the invention.

FIG. 5 is a structure diagram of the floating supporting mechanism. As shown in FIG. 5, the machine body of the self-moving robot 100 in this example comprises a base 130; the base 130 is provided with an accommodation space 1301; the floating supporting mechanisms 120 can slide in the accommodation space 1301, for example, the floating supporting mechanisms 120 can contract into the accommodation space and partially extend out of the accommodation space; particularly, the floating supporting mechanisms comprise springs 121, supporting wheels 122 and brackets 123, the supporting wheels 122 consist of wheels 124 and rotary shafts 125, the rotary shafts 125 are disposed on the brackets 123, and the brackets 123 are elastically connected with the base 130 through the springs 121, so that the supporting wheels 122 are elastically connected with the self-moving robot 100;

when the self-moving robot 100 walks on a flat surface, the springs 121 are in compressed states, and the supporting wheels 122 and the driving wheels 110 jointly support the self-moving robot 100, so that the self-moving robot 100 is kept horizontal. when the self-moving robot 100 encounters a step, the supporting wheels 122 are extruded by the step, the springs 121 contract, and the self-moving robot 100 is still basically kept horizontal under the supporting of the supporting wheels 122 and the driving wheels 110; and when the self-moving robot 100 encounters a pit, the springs 121 extend, the supporting wheels 122 prop against the pit, and the self-moving robot 100 is still basically kept horizontal under the supporting of the supporting wheels 122 and the driving wheels 110.

Figure 6:
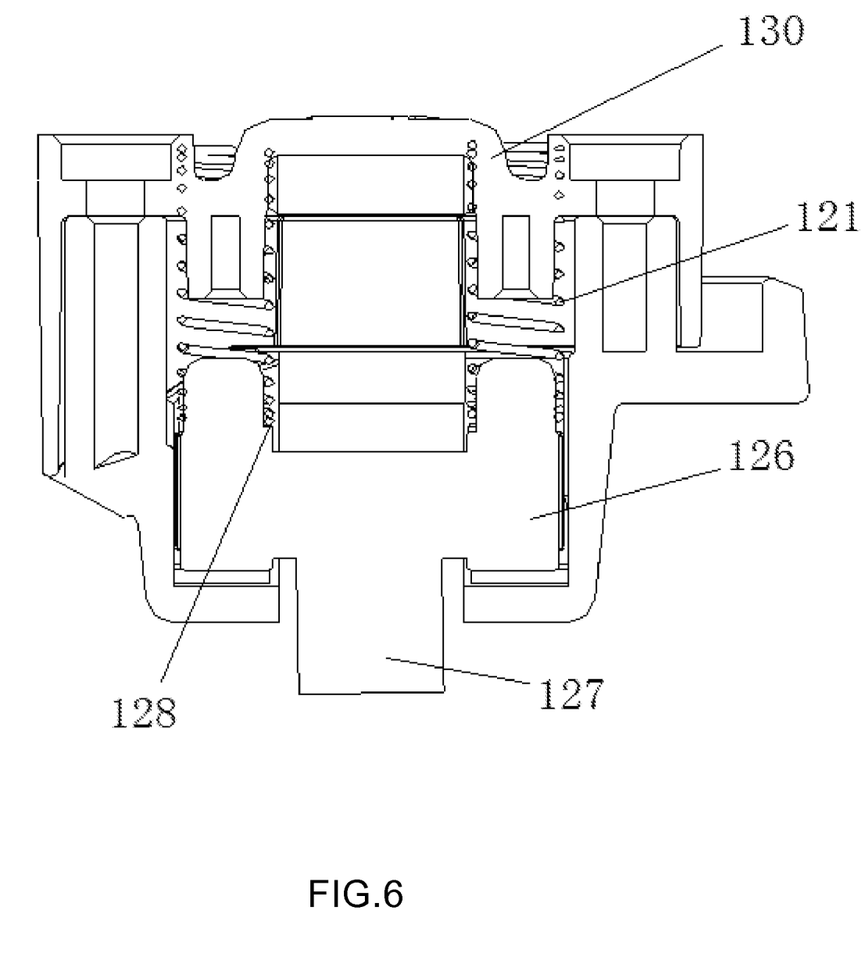
FIG. 6 is a structure diagram of a floating supporting mechanism provided in another example of the invention.

FIG. 6 is a structure diagram of a floating supporting mechanism provided in another example. As shown in FIG. 6, a base 130 of a self-moving robot 100 in this example is provided with an accommodation space 1301; the floating supporting mechanisms can slide in the accommodation space 1301, for example, the floating supporting mechanisms 120 can contract into the accommodation space and partially extend out of the accommodation space; particularly, the floating supporting mechanisms comprise springs 121 and supporting frames 126, the supporting frames 126 comprise protruding ends 127 and connecting ends 128, the protruding ends 127 are in contact with an operating surface and are partially exposed out of the base 130, and the connecting ends 128 are elastically connected with the base 130 through the springs 121, so that the supporting frames 126 are elastically connected with the self-moving robot 100; alternatively, the supporting frames 126 are made of anti-static wear-resistant materials;

when the self-moving robot 100 walks on a flat surface, the springs 121 are in compressed states, and the supporting frames 126 and the driving wheels 110 jointly support the self-moving robot 100, so that the self-moving robot 100 is kept horizontal; when the self-moving robot 100 encounters a step, the supporting frames 126 are extruded by the step, the springs 121 contract, and the self-moving robot 100 is still basically kept horizontal under the supporting of the supporting frames 126 and the driving wheels 110; and when the self-moving robot 100 encounters a pit, the springs 121 extend, the supporting frames 126 prop against the pit, and the self-moving robot 100 is still basically kept horizontal under the supporting of the supporting frames 126 and the driving wheels 110.

It should be stated that by utilizing the two kinds of floating supporting mechanisms as shown in FIG. 5 and FIG. 6 above, the springs 121 extend, and the supporting wheels 122 or the supporting frames 126 prop against the pit when the self-moving robot 100 encounters the pit. However, supporting forces of the supporting wheels 122 or the supporting frames 126 are too great, and will affect frictional forces between the driving wheels and the ground, leading to that the self-moving robot cannot walk conveniently. To improve the walking efficiency of the robot, the floating supporting mechanisms preferably do not affect or very slightly affect the frictional forces between the driving wheels and the ground. Particularly, as shown in FIG. 3, when a maximum distance between each floating supporting mechanism 120 and the bottom of the machine body of the robot and a minimum distance between the corresponding driving wheel and the bottom of the machine body of the robot are identical, the floating supporting mechanisms 120 are in contact with the flat surface, and the floating supporting mechanisms and the driving wheels 110 together support the self-moving robot 100 when the self-moving robot 100 walks on the flat surface, so that the self-moving robot 100 is kept horizontal; at this moment, the floating supporting mechanisms 120 have very little supporting forces; in addition, to reduce jolts during walking of the robot, a distance difference between the minimum distance between each floating supporting mechanism 120 and the bottom of the machine body of the robot and the maximum distance between the floating supporting mechanism 120 and the bottom of the machine body of the robot is less than or equal to 10 mm (that is, the floating distances of the floating supporting mechanisms are less than or equal to 10 mm); and it should be stated that the driving wheels are connected with the base of the self-moving robot through the springs generally, and when the robot is placed on the ground, the distance between the driving wheel and the bottom of the robot is minimum (the driving wheels are pressed by the machine body and the springs contract), which is described in detail in U.S. Pat. No. 8,474,090, and is thus not described herein.

In conclusion, the combined robot provided with the floating supporting mechanisms has the advantages that when the combined robot walks on the uneven ground, the floating supporting mechanisms can extend and contract to support, so that the walking stability of the combined robot is improved, and a jolting phenomenon and hidden dangers like getting stuck during walking are reduced.

The invention claimed is:

1. A combined robot, comprising:
   a self-moving robot and a functional unit detachably combined into the self-moving robot through a connecting piece;
   driving wheels and a driven wheel disposed at a bottom of a mainbody of the self-moving robot such that:
   the driving wheels are located on a left side and a right side of the bottom of the mainbody by taking an advancing direction when the self-moving robot operates as a forward direction; and
   the driven wheel is located at a front end or a rear end of the bottom of the mainbody;
   a control center is disposed in the combined robot and controls the combined robot to operate, wherein one end away from the driven wheel of the bottom of the mainbody of the self-moving robot is a supporting end; and
   elastic members disposed at the supporting end supporting the supporting end on a walking plane when the self-moving robot walks.

2. The combined robot of claim 1, wherein a distance between each elastic member and a vertex of the supporting end is less than or equal to ⅓ of a length of the mainbody of the self-moving robot.

3. The combined robot of claim 1, wherein the set quantity of the elastic members is two, and the elastic members are disposed on a left side and a right side of the supporting end respectively.

4. The combined robot of claim 3, wherein a cleaning cloth assembly is detachably mounted at the supporting end, and is located between the two elastic member.

5. The combined robot of claim 1, wherein:
the mainbody of the self-moving robot comprises a base provided with an accommodation space; and
the elastic members are disposed in the accommodation space in a sliding manner.

6. The combined robot of claim 5, wherein:
the elastic members comprise springs, supporting wheels, and brackets;
the supporting wheels include wheels and rotary shafts; and
the rotary shafts are disposed on the brackets elastically connected with the base through the springs.

7. The combined robot of claim 5, wherein:
the elastic members are comprised of springs and supporting frames; and
the supporting frames are comprised of protruding ends and connecting ends, the protruding ends being partially exposed out of the base, and the connecting ends being elastically connected with the base through the springs.

8. The combined robot of claim 7, wherein the supporting frames are comprised of anti-static wear-resistant materials.

9. The combined robot of claim 1, wherein the connecting piece comprises:
a body;
a boss disposed on one side of the body;
a locating column disposed on the other side of the body;
a pit disposed on a lower surface of the functional unit; and
a groove disposed on an upper surface of the self-moving robot, wherein:
the set quantity and the set position of the pit correspond to the set quantity and the set position of the boss, and
the set quantity and the set position of the groove correspond to the set quantity and the set position of the locating column.

10. The combined robot of claim 1, wherein the distance between each elastic member and the vertex of the supporting end is less than or equal to ½ of a distance between the corresponding driving wheel and the vertex of the supporting end.

11. The combined robot of claim 1, wherein:
a maximum distance between each elastic member and the bottom of the mainbody of the self-moving robot and a minimum distance between the corresponding driving wheel and the bottom of the mainbody of the self-moving robot are identical; and
a distance difference between the minimum distance between the elastic member and the bottom of the mainbody of the self-moving robot and the maximum distance between the elastic member and the bottom of the mainbody of the self-moving robot is less than or equal to 10 mm.

* * * * *